(12) United States Patent
Whiteside

(10) Patent No.: US 7,213,815 B2
(45) Date of Patent: May 8, 2007

(54) MECHANIC'S CREEPER

(75) Inventor: Kirt E. Whiteside, Marion, OH (US)

(73) Assignee: Whiteside Manufacturing Company, Delaware, OH (US)

( * ) Notice: Subject to any disclaimer, the term of this patent is extended or adjusted under 35 U.S.C. 154(b) by 715 days.

(21) Appl. No.: 09/780,603

(22) Filed: Feb. 12, 2001

(65) Prior Publication Data

US 2001/0020773 A1    Sep. 13, 2001

Related U.S. Application Data

(63) Continuation-in-part of application No. 09/523,469, filed on Mar. 10, 2000, now Pat. No. 6,705,622.

(51) Int. Cl.
*B25H 5/00* (2006.01)
(52) U.S. Cl. ....................... 280/32.6; 16/45; 301/5.303
(58) Field of Classification Search ............... 280/32.6, 280/640; 16/20, 21, 18 R, 45, 22; 301/5.309, 301/5.307, 64.701, 64.703
See application file for complete search history.

(56) References Cited

U.S. PATENT DOCUMENTS

| | | | | |
|---|---|---|---|---|
| 1,639,801 A | * | 8/1927 | Heise | 280/32.6 |
| 1,882,497 A | * | 10/1932 | Jarvis | 16/45 |
| 2,487,706 A | * | 11/1949 | Happ | 280/32.6 |
| 2,684,734 A | | 7/1954 | Wilson | 188/74 |
| 3,239,872 A | * | 3/1966 | Kitrell | 16/44 |
| 3,604,756 A | * | 9/1971 | Gruber | 301/5.309 |
| 4,034,434 A | * | 7/1977 | Block | 15/79 R |
| 4,054,335 A | * | 10/1977 | Timmer | 301/5.309 |
| 4,444,435 A | * | 4/1984 | Honsa | 301/5.309 |

(Continued)

OTHER PUBLICATIONS

Whiteside Mfg. Co. catalog (2000).

*Primary Examiner*—Jeff Restifo
(74) *Attorney, Agent, or Firm*—Renner, Kenner, Greive, Bobak, Taylor & Weber

(57) ABSTRACT

A mechanic's creeper (10) includes a pad (12) supported between a plurality of side rails (14) by a plurality of crossbars (15). The side rails (14) are of tear-shaped cross section such that no sharp edges are provided adjacent to the pad (12) held between the side rails (14). The pad (12), side rails (14), and crossbars (15) are held off the ground by a plurality of caster assemblies (20). The caster assemblies (20) are connected only to the bottom surface (16) of the side rails (14) such that no protrusion is created on the top surface (17) of the side rails (14). Specifically, each of the caster assemblies (20) is connected to an associated side rail (14) by a rivet nut (54) that communicates only with the bottom surface (16) of side rail (14). The caster assemblies (20) further include rolling elements (24, 26) and bearing races (32, 34) that allow the caster assemblies (20) to rotate about the axis of a kingpin (42). The kingpin (42) retains the various elements of the caster assemblies (20) in an operative relation. Additionally, the lateral extent of side rails (14) is such that the top race (32) lies wholly within the vertical profile of its associated side rail (14). An improved wheel design for a caster assembly is also provided, wherein the wheel (140) provides a rounded radial surface (160) to lessen the amount of surface area contact between the radial surface (160) and the surface upon which the wheel (140) rests.

16 Claims, 3 Drawing Sheets

U.S. PATENT DOCUMENTS

| | | | |
|---|---|---|---|
| 4,559,669 A * | 12/1985 | Bonzer et al. ................. | 16/44 |
| 4,707,880 A * | 11/1987 | Doyle et al. .................... | 16/38 |
| 5,174,592 A | 12/1992 | Pool ......................... | 280/32.6 |
| 5,199,131 A | 4/1993 | Harris ........................... | 16/21 |
| 5,263,226 A | 11/1993 | Roy et al. .................... | 16/35 R |
| 5,287,594 A | 2/1994 | Hicks ........................... | 16/20 |
| 5,472,219 A | 12/1995 | Eckstrum ................... | 280/32.6 |
| 5,527,051 A | 6/1996 | Plaza ......................... | 280/32.6 |
| 5,567,019 A * | 10/1996 | Raza et al. .............. | 301/5.309 |
| 5,692,809 A * | 12/1997 | Hook ...................... | 301/5.309 |
| 5,745,951 A | 5/1998 | Waner ....................... | 16/31 R |
| 5,813,090 A | 9/1998 | Miles ............................ | 16/37 |
| 5,823,634 A * | 10/1998 | Pozzobon ................ | 301/5.309 |
| 5,863,053 A * | 1/1999 | Berry ........................ | 280/32.6 |
| D406,433 S | 3/1999 | Taylor et al. ................ | D34/23 |
| 5,895,062 A | 4/1999 | Miles et al. ............... | 280/32.6 |
| 5,947,489 A * | 9/1999 | Tucker ...................... | 280/32.6 |
| 6,076,838 A | 6/2000 | Peterson et al. ........... | 280/32.6 |

* cited by examiner

MECHANIC'S CREEPER

CROSS REFERENCE TO RELATED APPLICATION

This application is a continuation in part of U.S. patent application Ser. No. 09/523,469, filed Mar. 10, 2000.

TECHNICAL FIELD

The present invention relates to mechanic's creepers and, more particularly, to a mechanic's creeper having an improved mobility based on a unique design of the wheels. Moreover, this invention relates to a creeper with an improved side rail and caster assembly. These design features serve to provide a more contoured fit for the user, an improved resistance to wear and tear of the caster assemblies, a lack of protrusions on the side rails so as to avoid the snagging and tearing of clothes and possible scratches to the user's body.

BACKGROUND ART

Mechanic's creepers are in wide-spread use, however, it has been found that the common, prior art mechanic's creeper design can be improved in a number of ways. Currently, mechanic's creepers are designed with side rails usually of rectangular or square cross section. The side rails thus provide sharp edges that lie adjacent to the padding held between the side rails. Because the padding sections provided between the side rails are not normally as wide as the breadth of the shoulders of the typical user, the sharp edges can often present a discomfort to the user.

Also, the casters on the typical mechanic's creeper are attached to the side rails in such a way as to provide protrusions on the top surface of the side rails. These protrusions can be an additional source of discomfort to the user because they are likely to snag and tear the user's clothing and scratch the user's body. More specifically, in mechanic's creepers of the prior art, the casters are attached to the side rails by means of a caster-carrying stud that is inserted through both the top and bottom walls of the side rail and secured by a nut threaded thereon. The remainder of the caster assembly is thereby positioned below the side rail and a bolt-head protrusion is undesirably located on the top surface of the side rail.

The width of the side rails in mechanic's creepers of the prior art relative to the diameter of the caster raceways needed to support the creeper also presents problems. Prior art mechanic's creeper designs incorporate caster assemblies having bearing races that are of larger diameter than the width of the side rails such that a portion of the bearing race extends beyond the sides of the side rails. As such, the portion of the bearing race which extends beyond the side rails is susceptible to being bumped or otherwise contacted, which could readily loosen or otherwise damage the caster assembly. Moreover, since the bearing race does not fully engage the side rail all the way around the race, the rocking forces born by the caster assemblies as the mechanic's creeper is utilized create weaknesses in the caster assemblies. For instance, the nuts securing the bolts through the side rails tend to loosen due to the torque placed upon the stem of the bolt as the creeper is moved and the caster assemblies roll and change directions. Moreover, adverse forces on the caster stems may well cause a shearing of these stems. In addition, because the bearing races do not completely engage the side rails, the weight placed upon the mechanic's creeper (i.e., the weight of the user's body) is not evenly distributed to the bearing race and the bearings therein. This increases the wearing of the bearings and therefore shortens the useful life of the caster assemblies and the mechanic's creeper as a whole.

The wheels used in the caster assemblies of prior art mechanic's creepers are also in need of improvement. In the prior art, the wheels of a mechanic's creeper generally contact the ground with a wide, flat bottom surface area. This design maximizes the amount of friction between the wheel surface and the ground surface on which the creeper rests. Mechanic's creepers are designed to be capable of moving in any direction and, thus, excessive friction between the caster wheels and the ground surface is counterproductive to the mobility of the mechanic's creeper.

Thus, there exists a need in the art for a mechanic's creeper design that provides a more comfortable, contoured fit for the user when lying down on the pads held between the side rails. Additionally, there exists a need in the art for a mechanic's creeper in which the caster assemblies are attached to the side rails without creating any protrusions on the top surface of the side rails and which also attach in a manner that prevents wear and tear to the bearings and the bearing races such as encountered with current mechanic's creeper designs. A need in the art also exists for employing an improved wheel design in the caster assemblies of mechanic's creepers.

DISCLOSURE OF THE INVENTION

It is thus an object of the present invention to provide a mechanic's creeper, wherein an improved wheel design is employed in the casters assemblies so as to decrease friction between the wheels and the ground surface on which the mechanic's creeper is employed.

It is another object of the present invention to provide a mechanic's creeper, as above, wherein the wheels of the caster assemblies are generally hemispherical or semi-elliptical in cross section at areas proximate their radial surface.

It is a further object of the present invention to provide a mechanic's creeper with a caster assembly having bearing races that are fully positioned under and within the profile of the side rails.

It is yet another object of the present invention to provide a mechanic's creeper, as above, wherein the caster assemblies are attached to the side rails without creating any protrusions on the top surface of the side rails.

It is still a further object of the present invention to provide a mechanic's creeper, as above, wherein the side rails are of tapered and contoured cross section such that the side rails do not provide sharp edges adjacent to the padding of the mechanic's creeper.

It is an additional object of the present invention to provide a mechanic's creeper, as above, wherein the caster assemblies do not include caster stems.

These and other objects of the present invention as well as the advantages thereof over existing prior art forms, which will become apparent from the description to follow are accomplished by the improvements hereinafter described and claimed.

In general, a creeper made in accordance with the present invention includes a pad supported between opposed side rails. A plurality of caster assemblies attach to and support the side rails. Each of the caster assemblies include a wheel having a wheel body with a radial surface, the width of the contact between the radial surface and a work surface upon which the creeper is placed being from about 50 to about 75 percent of the maximum width of the wheel body.

A preferred exemplary mechanic's creeper incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
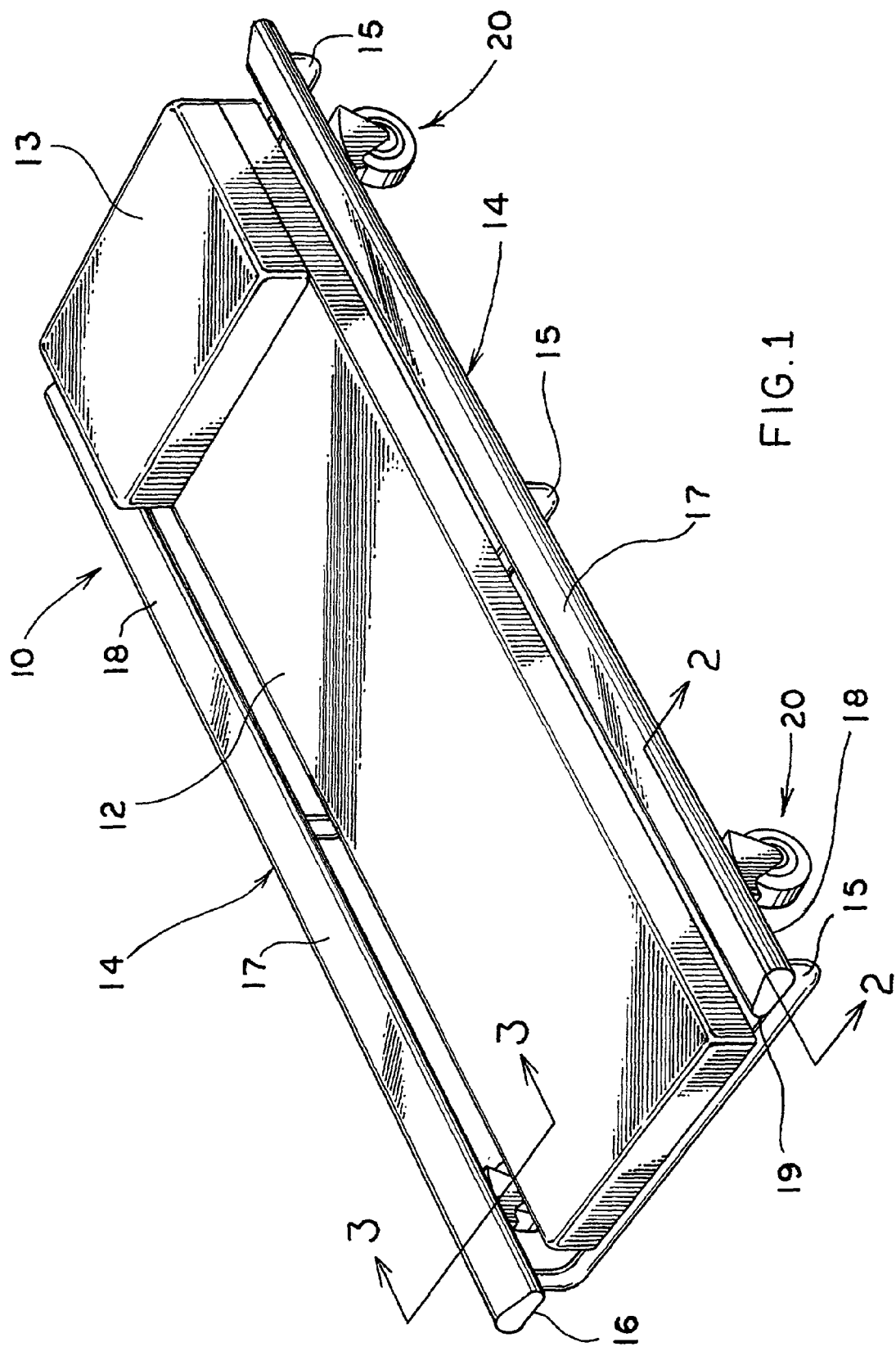
FIG. 1 is a perspective view of the mechanic's creeper made in accordance with the concepts of the present invention.
Figure 3:
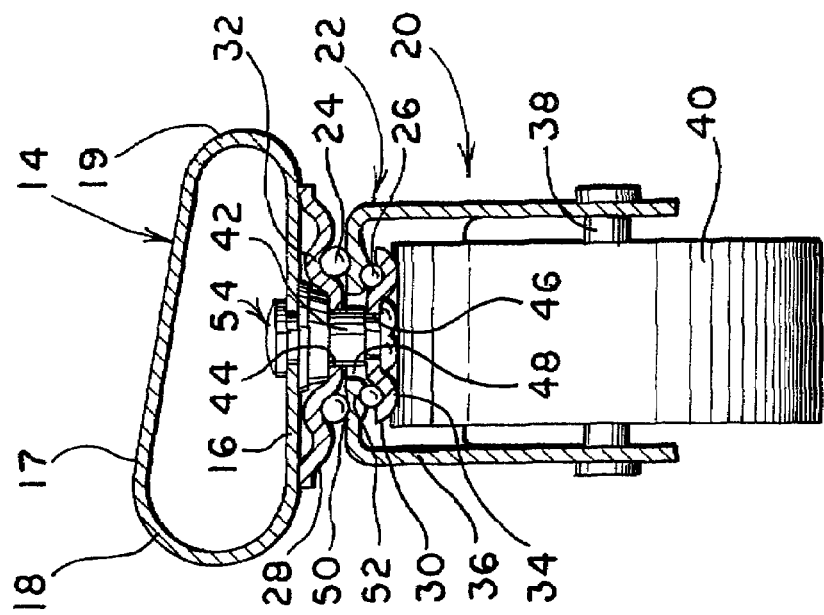
FIG. 3 is a sectional view taken substantially along line 3—3 of FIG. 1.

A mechanic's creeper made in accordance with the concepts of the present invention is generally indicated by the numeral 10 and includes padding 12 and, optionally, a headrest 13 held between opposed side rails, generally indicated by the numeral 14, on a plurality of crossbars 15. As hereinabove discussed, side rails of the prior art are normally of square or rectangular cross section and therefore provide sharp edges adjacent to the padding held between the side rails. However, as seen in FIGS. 1 and 3, side rails 14 of the present invention are generally tear-shaped so as to eliminate the discomfort encountered when utilizing mechanic's creepers of the prior art. As such, each side rail 14 is hollow and includes a generally horizontal bottom surface 16, which thus lies substantially parallel to the surface upon which creeper 10 is placed, and an opposed top surface 17 which is angled in relation to bottom surface 16 so as to provide a generally tapered cross section. The lateral outer ends of surfaces 16 and 17 are connected by an outer arcuate surface 18 and the laterally inner ends of surfaces 16 and 17 are connected by an inner arcuate surface 19. Of course, because of the taper, just described, the radius of curvature of surface 18 is greater than that of surface 19. The lateral edges of surfaces 18 and 19 define the vertical profile of each rail 14.

Since side walls 14 taper in the direction of padding 12 such that the surface 19 of side rails 14 is positioned adjacent to padding 12, side rails 14 and padding 12 cooperate to cradle an individual using creeper 10 to minimize any discomfort. It should be readily understood that, while the preferred shape disclosed herein for side rails 14 is a tear shape, the present invention should not be limited specifically thereto or thereby. Indeed, the basic improvement achieved by side rails 14 is the provision of a tapered side rail design and elimination of sharp edges adjacent to padding 12 and, therefore, this aspect of the present invention should be understood to encompass all tapered side rail designs eliminating such sharp edges.

Padding 12, side rails 14 and crossbars 15 are held off the ground and made mobile by a plurality of caster assemblies generally indicated by the numeral 20 and attached to the bottom surface 16 of side rails 14 in a manner as will be hereinafter described. Caster assemblies 20 each include a wheel assembly 22 that rotates on a vertical axis on a set of top and bottom rolling elements 24, 26, respectively, that are retained within top and bottom bearing brackets 28, 30, respectively. More specifically, top rolling elements 24 are maintained between top race 32 of top bearing bracket 28 and a horn 36 of wheel assembly 22, while bottom rolling elements 26 are maintained between a bottom race 34 of bottom bearing bracket 30 and horn 36 of wheel assembly 22. Horn 36, via axle 38, carries a wheel 40 such that wheel 40 may revolve on axle 38 as creeper 10 is being moved. Moreover, wheel 40 may rotate to allow for movement of creeper 10 in any direction because horn 36 is held between top and bottom rolling elements 24, 26 so as to pivot around the vertical axis defined by a kingpin or rivet 42.

Figure 2:
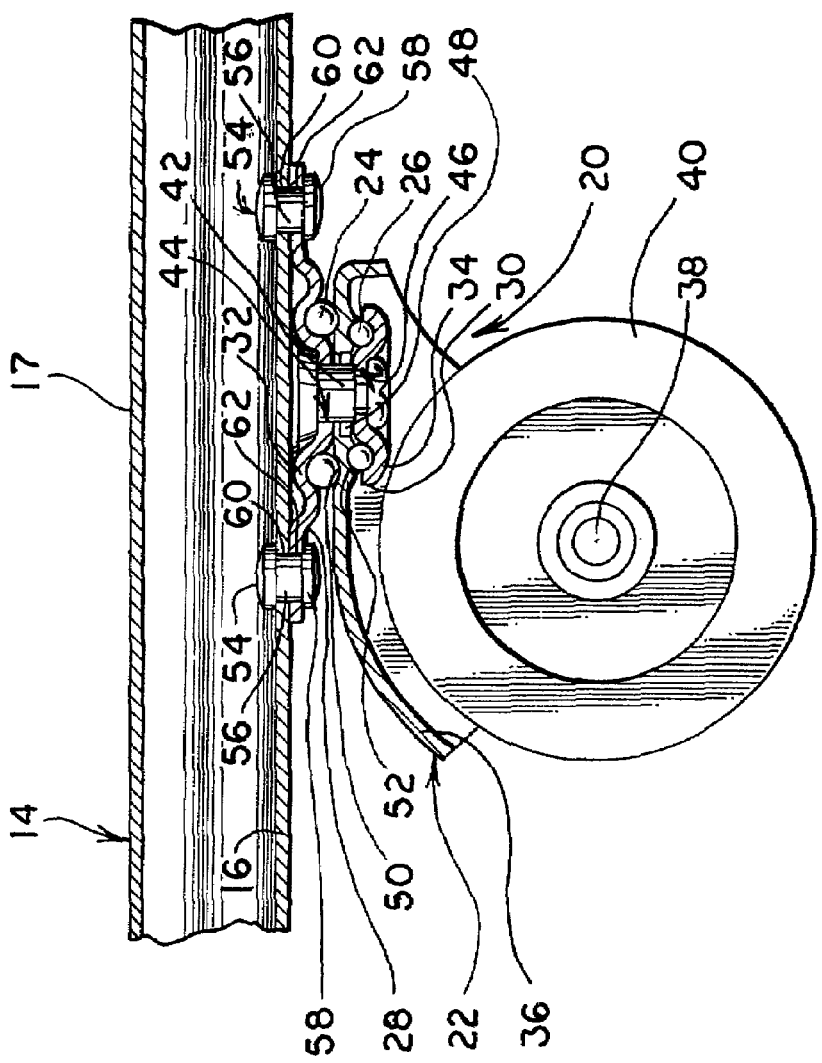
FIG. 2 is a fragmented, sectional view taken substantially along line 2—2 of FIG. 1.

Kingpin 42 extends through apertures 44, 46 and 48 in top bearing bracket 28, bottom bearing bracket 30 and horn 36, respectively, such that horn 36 is securely retained between rolling elements 24, 26 and capable of rotating thereon. It should be noted that apertures 44 and 46 in top and bottom bearing brackets 28 and 30 abut and intimately contact kingpin 42 while aperture 48 in horn 36 provides a gap between kingpin 42 and horn 36 so as to facilitate the rotation of horn 36 and associated wheel 40 around the axis of kingpin 42. To ensure that the gap provided by aperture 48 is not easily compromised by a shifting of horn 36, and also to facilitate the rotation of horn 36 around the axis of kingpin 42, horn 36 is provided with top and bottom raceways 50, 52, respectively, which receive top and bottom rolling elements 24, 26, respectively. Although top and bottom raceways 50, 52 are not as defined as top and bottom races 32, 34, they ensure that horn 36 and rolling elements 24, 26 will be biased to remain in the position as shown in FIGS. 2 and 3, wherein horn 36 rotates on rolling elements 24, 26 and is free from contact with kingpin 42.

Kingpin 42 is substantially different from kingpins (stems) utilized in mechanic's creepers of the prior art. The prior art utilizes caster stems which, in addition to providing an axis for rotation of the caster assemblies, also provide the main means for attachment of the caster assemblies to the side rails. Unlike kingpin 42 of the present invention, the stems of the prior art are basically bolts extending fully through the side rails and secured by nuts threaded thereon. Thus, kingpins of the prior art create protrusions on the top surface of the side rails. These protrusions inevitably cause discomfort to the individual using the mechanic's creeper— snagging and tearing the individual's clothing and scratching the individual's body. As is clearly shown herein, kingpin 42 does not extend to or through the top surface of side rails 14. Moreover, kingpin 42, unlike kingpins (stems) of the prior art, serves only to hold the various elements of caster assembly 20 (i.e., top and bottom bearing brackets 28, 30, and wheel assembly 22) together, and does not attach caster assembly 20 to side rails 14.

Rather, caster assemblies 20 of the present invention are attached to side rails 14 by two or more fasteners that will be referred to herein as rivet nuts generally indicated by the numeral 54. Rivet nuts 54 removably attach top bearing bracket 28 and the associated remainder of each caster assembly 20 to bottom surface 16 of each side rail 14. Rivet nuts 54 include rivets 56 that have a threaded bore into which bolts 58 fasten to secure top bearing bracket 28 to the bottom surface 16 of side rail 14. Rivet 56 of rivet nut 54 is substantially, permanently attached to bottom surface 16 of side rail 14, through apertures 60 in bottom surface 16, and provides a threaded bore for bolt 58 of rivet nut 54. Top bearing bracket 28 includes apertures 62 that align with rivets 56 which are secured to side rail 14, and therefore top bearing bracket 28 and the associated remainder of caster assembly 30 can be removably secured to bottom surface 16 of side rail 14 by the bolts 58 of the rivet nuts 54. This method of attaching caster assemblies 20 to side rails 14, results in a top surface 17 of side rails 14, without any protrusions, which is another novel aspect of the present invention.

In a preferred embodiment of the present invention, side rails 14 are not only tear shaped, but also have a vertical profile, as previously described, which is sufficiently wide so as to fully contact and cover the entire circumference of top race 32. Top race 32 therefore lies wholly within the vertical profile of side rails 14. As previously described, in the prior art, the bearing races are of larger diameter than the width of the side rails to which they attach which renders the caster assemblies susceptible to damage and creates weaknesses in the nuts securing the bolts used to secure the caster assemblies to the side rails. Also, this prior art design increases the wear and tear to the bearings because the weight placed on the prior art mechanic's creeper is not evenly distributed to the bearing race. The preferred embodiment of the present invention solves this problem by ensuring that top race 32 fully engages and is fully encompassed within the profile of side rails 14.

Figure 4:
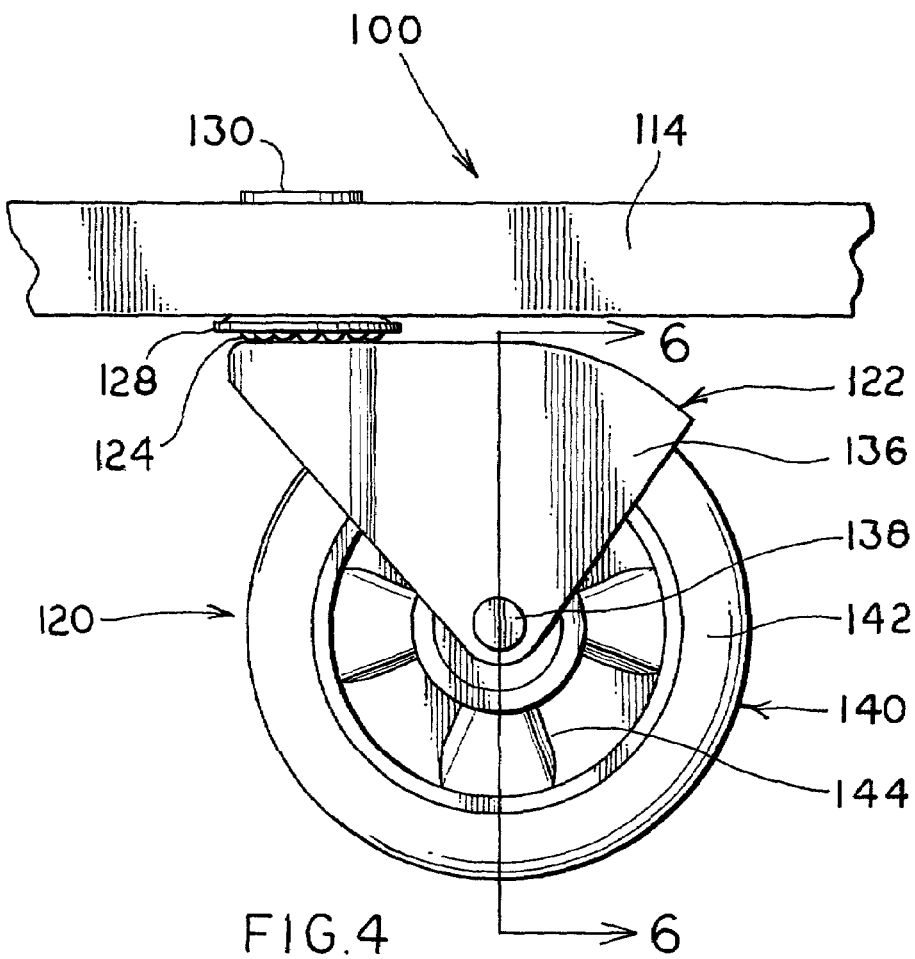
FIG. 4 is a side plan view of a caster assembly according to one embodiment of the present invention.

The present invention is also directed to a preferred embodiment for a wheel to be used in a caster assembly. The preferred wheel is disclosed with reference to FIGS. 4–6. In FIG. 4, a portion of a mechanic's creeper is generally indicated by the numeral 100. More particularly, the portion that is shown in FIG. 4 is a portion of a side rail 114 which may take on any configuration or which may be similar to that which is shown in FIG. 3. A caster assembly, generally indicated by the numeral 120, is shown as being secured to side rail 114 in a conventional manner. But, it should readily be appreciated that the wheel design that will be disclosed hereinbelow may be incorporated into other caster assembly designs such as, for example, caster assemblies 20 disclosed hereinabove.

In FIG. 4, it can be seen that side rail 114 receives a caster assembly 120. More particularly, each of the opposed side rails 114 will preferably receive at least two caster assemblies 120 as shown, for example, in FIG. 1. Each caster assembly 120 includes a wheel assembly 122 that rotates on a vertical axis on rolling elements 124 retained within a bearing bracket 128. Bearing bracket 128 has a race (not shown), such as race 32 of FIGS. 2 and 3, for retaining rolling elements 124. Thus, rolling elements 124 are maintained between bearing bracket 128 and a horn 136 by a kingpin (or bolt and nut) 130 such that horn 136 can rotate about the vertical axis of kingpin 130 on rolling elements 124. Preferably, to help prevent horn 136 from shifting, and to facilitate the rotation of horn 136 around the axis of king pin 130, horn 136 is provided with a top raceway (not shown) like top raceway 50 of FIGS. 2 and 3. Horn 136, like horn 36 of FIGS. 2 and 3, carries a wheel generally indicated by the numeral 140 via an axle 138. While caster assembly 120, just described, is generally known in the art, the design of wheel 140 to be discussed hereinbelow for use in a caster assembly for a creeper has not heretofore been known in the art.

Figures 5, 6:
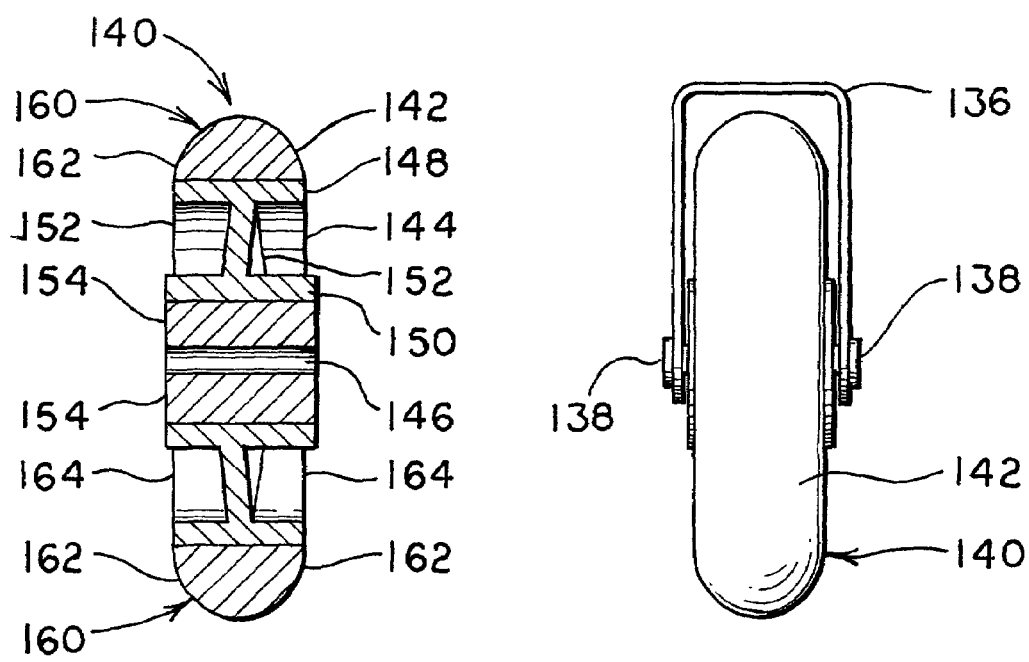
FIG. 5 is a side view of a caster assembly wheel shown in FIG. 4.
FIG. 6 is a sectional view taken substantially along line 6—6 of FIG. 5.

With reference to FIGS. 5 and 6, it can be seen that wheel 140 includes a wheel body 142 disposed around a hub 144 having an axial bore 146 therein for receiving axle 138. Hub 144 includes an inner rim 150, proximate axial bore 146, and an outer rim 148, distanced from inner rim 150 by radial supports 152. Inner rim 150 is distanced from axial bore 146 by bearing 154, which is preferably made of materials such as polyurethane, polypropylene, polyolefin, acetal resin, nylon and the like, to allow for smooth rotation of axle 138. Of course, ball bearings and the like may alternatively be employed. It should be readily appreciated, however, that the specific design of hub 144 is not particularly relevant to providing the alternative wheel design of the present invention and, therefore, various hub designs, with or without a bearing, may be used in providing a wheel in accordance with this aspect of the present invention.

Wheel 140, unlike caster wheels of the prior art, is not flat along the majority of its radial surface. Rather, wheel body 142 is rounded at its radial surface, as represented at numeral 160. By providing a rounded radial surface 160, wheel 140 minimizes the surface area of contact between radial surface 160 and the surface upon which the mechanic's creeper 100 is placed. Thus, as mechanic's creeper 100 is moved and repositioned on a surface, the frictional forces opposing rotation of caster assemblies 120 on rolling elements 124 are substantially reduced.

Wheel body 142 can be formed of any suitable material that is commonly employed in the art such as, for example, polymeric materials such polypropylene, monoprene, polyurethane, thermoplastic rubber, polyolefin, and the like. The material used for wheel body 142 should be of high hardness and wear resistant so that the structural integrity of wheel body 142 is maintained over a substantial period of use. Hardness should generally range from about 65 to about 85 on the Shore durometer hardness type D scale. Additionally, the material of body 142 should exhibit a low coefficient of friction with the types of surfaces that body 142 will most likely contact such as, typically, the cement surface of the floor of an automobile service center.

To better understand the desirable characteristics of wheel body 142 it is important to understand, as mentioned above, that a prior art caster wheel does not provide a rounded radial surface but is instead flat along a substantial majority of its radial surface. Thus, in the prior art, a caster wheel provides abrupt transitions from its side walls to its radial surface. This sharp transition subsumes approximately 90 degrees such that prior art caster wheels are substantially rectangular in cross section, and the surface contact between the wheel's radial surface and a work surface extends substantially along the entire width of the caster wheel, as is clearly evident in FIG. 3. In caster wheel 140 of the present invention, a rounded radial surface 160 is provided by forming wheel body 142 with less abrupt transitions 162 from side walls 164 of hub 144 to the apex of radial surface 160.

Transitions 162, in their most basic design, extend to form a wheel body 142 of hemispherical cross section, as seen in FIG. 6. In such a design, the surface contact between radial surface 160 and a work surface extends along a width well short of the maximum width of wheel body 142 generally defined by side walls 164. Of course, the amount of surface contact between radial surface 160 and a work surface will necessarily depend upon the hardness of the material from which wheel body 142 is formed. Thus, to more particularly characterize the present invention, it should be noted that transitions 162 extend from side walls 164 of wheel 140 so as to provide a radial surface 160 wherein the width of the surface contact between radial surface 160 and a work surface upon which caster assembly 120 is placed is from about 50 to about 75 percent of the maximum width of wheel body 142 generally defined between side walls 164. With this understanding, it should be readily apparent that transitions 162 need not extend to provide a wheel body 142 of hemispherical cross section, but rather, transitions 162 forming wheel bodies of a semi-elliptical cross section could also be provided.

In light of the foregoing, it should thus be evident that a mechanic's creeper constructed as described herein substantially improves the art and otherwise accomplishes the objects of the present invention. While only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A creeper comprising opposed side rails having a planar bottom surface; a pad supported between said side rails; and a plurality of caster assemblies rotatable on a vertical axis relative to said side rails and supporting said side rails; each of said plurality of caster assemblies attached to said planar bottom surface and fully positioned under and within the profile of said side rails, and including a wheel having a wheel body with a hemispherical or semi-elliptical cross section, and with a hardness such that, when used on a work surface, the shape of said wheel body remains substantially unchanged, said hardness of said wheel body ranging from about 65 to 85 on the Shore D durometer hardness type D scale.

2. A creeper according to claim 1 wherein each said wheel of said plurality of caster assemblies further comprises a hub having an axial bore, an inner rim proximate said axial bore, and an outer rim distanced from said inner rim by radial supports.

3. A creeper according to claim 2 wherein said axial bore is defined by a bearing.

4. A creeper according to claim 3 wherein said bearing is made of a material selected from the group consisting of polyurethane, acetyl resin, polyolefin, polypropylene and nylon.

5. A creeper according to claim 1 wherein said wheel body is formed from material selected from the group consisting of polyurethane, thermoplastic rubber, polyolefin, polypropylene and monoprene.

6. A creeper comprising opposed side rails; a pad supported between said side rails; said side rails having a top and bottom surface, said top surface tapering toward said bottom surface to define a decreased cross section of said side rails, the decreased cross section of said side rails being positioned adjacent said pad; and a plurality of caster assemblies attached to and supporting said side rails; each of said plurality of caster assemblies including a wheel including a wheel body extending, in hemispherical or semi-elliptical cross section, from a hub and having a hardness such that, when used on a work surface, the shape of said wheel body remains substantially unchanged, and a top bearing bracket having a top race, said top bearing bracket being attached to one of said side rails such that said top race of said top bearing bracket lies wholly within the vertical profile of said side rail.

7. A creeper according to claim 6, wherein said hub includes an axial bore, an inner rim proximate said axial bore, and an outer rim distanced from said inner rim by radial supports.

8. A creeper according to claim 7 wherein said axial bore is defined by a bearing.

9. A creeper according to claim 8 wherein said bearing is made of a material selected from the group consisting of polyurethane, acetyl resin, polyolefin, polypropylene and nylon.

10. A creeper according to claim 6 wherein said wheel body is formed from material selected from the group consisting of polyurethane, thermoplastic rubber, polyolefin, polypropylene and monoprene.

11. A creeper according to claim 10 wherein said wheel body has a hardness of from about 65 to about 85 on the Shore durometer hardness type D scale.

12. A creeper according to claim 6 wherein the width of the surface contact between said radial surface and a work surface upon which the creeper is placed is from about 50 to about 75 percent of the maximum width of said wheel body.

13. A creeper according to claim 6 wherein said plurality of caster assemblies are attached to said side rails without creating a protrusion on said top surface of said side rails.

14. A creeper according to claim 13 wherein said caster assemblies each include a bottom bearing bracket having a bottom race; a wheel assembly carrying said wheel and connected to said caster assembly between said top and bottom bearing brackets; top rolling elements retained within said top race between said top bearing bracket and a portion of said wheel assembly; and bottom rolling elements retained within said bottom race between said bottom bearing bracket and a portion of said wheel assembly.

15. A creeper according to claim 14 wherein each of said caster assemblies further include a kingpin, said bottom bearing bracket and said wheel assembly being held in operative position by said kingpin.

16. A creeper according to claim 15 wherein said top bearing bracket is secured to said bottom surface of said side rails by rivet nuts.

* * * * *